United States Patent
Bader et al.

(10) Patent No.: US 7,316,170 B2
(45) Date of Patent: Jan. 8, 2008

(54) METHOD AND MEASURING CONFIGURATION FOR MEASURING BACKLASH AT AN AXIAL JOINT

(75) Inventors: Axel Bader, Friedberg (DE); Sven Hansen, Berstadt (DE); Steffen Schmidt, Aalen (DE); Kim Henrich, Gelnhaar (DE)

(73) Assignee: ABB Patent GmbH, Ladenburg (DE)

( * ) Notice: Subject to any disclaimer, the term of this patent is extended or adjusted under 35 U.S.C. 154(b) by 59 days.

(21) Appl. No.: 11/153,043

(22) Filed: Jun. 15, 2005

(65) Prior Publication Data

US 2005/0274208 A1    Dec. 15, 2005

(30) Foreign Application Priority Data

Jun. 15, 2004  (DE) .................. 10 2004 028 558

(51) Int. Cl.
*G01N 19/00* (2006.01)
(52) U.S. Cl. ..................... 73/865.9; 700/245
(58) Field of Classification Search .............. 73/865.9; 702/150; 700/245
See application file for complete search history.

(56) References Cited

U.S. PATENT DOCUMENTS

| 4,676,002 | A | * | 6/1987 | Slocum ..................... 33/1 MP |
| 4,868,475 | A | * | 9/1989 | Rogozinski et al. ........ 318/632 |
| 5,383,368 | A | * | 1/1995 | Franke et al. ................. 73/800 |
| 5,424,960 | A | | 6/1995 | Watanabe et al. |
| 6,070,109 | A | * | 5/2000 | McGee et al. ............... 700/259 |
| 6,252,368 | B1 | | 6/2001 | Sugie |
| 6,725,735 | B2 | * | 4/2004 | Hjelm ........................ 73/865.9 |
| 6,959,103 | B2 | * | 10/2005 | Matsunaga et al. ......... 382/106 |
| 6,970,802 | B2 | * | 11/2005 | Ban et al. .................... 702/153 |
| 6,996,912 | B2 | * | 2/2006 | Raab et al. .................... 33/503 |
| 2002/0013675 | A1 | | 1/2002 | Knoll et al. |
| 2004/0027139 | A1 | * | 2/2004 | Pettersson et al. .......... 324/661 |
| 2005/0278067 | A1 | * | 12/2005 | Bader et al. ................. 700/245 |

FOREIGN PATENT DOCUMENTS

| DE | 43 16 817 A1 | 11/1994 |
| DE | 198 54 011 A1 | 5/2000 |
| WO | 96/ 40558 | 12/1996 |

* cited by examiner

*Primary Examiner*—Michael Cygan
*Assistant Examiner*—Punam Patel
(74) *Attorney, Agent, or Firm*—Laurence A. Greenberg; Werner H. Stemer; Ralph E. Locher

(57) ABSTRACT

A method measures the backlash at an axial joint of an industrial robot having a first and a second robot knuckle that are movably connected to each other in a direction of rotation by the axial joint. A load-transmitting device applies a predeterminable force alternately in a measuring line to the first robot knuckle, connected to the free end of a robot arm. A deflection sensor measures the deflection of the first robot knuckle at a predetermined distance from the axis of rotation of the axial joint, and an evaluation device connected to the displacement sensor calculates a turning angle of the first robot knuckle as a measure of a backlash present at the axial joint, taking into account the geometrical arrangement data in the measurement of the deflection sensor and the industrial robot and also the measured deflection.

19 Claims, 5 Drawing Sheets

METHOD AND MEASURING CONFIGURATION FOR MEASURING BACKLASH AT AN AXIAL JOINT

BACKGROUND OF THE INVENTION

FIELD OF THE INVENTION

The invention relates to a method for measuring backlash of an axial joint of an industrial robot. The invention also relates to a measuring configuration for measuring the backlash at the axial joint.

It is generally known for the mechanical backlash of a bearing axis or a transmission shaft of an industrial robot to be measured with a meter. For this purpose, the robot knuckles are loaded with weights in a desired way by the persons carrying out the measurement. The changed position of the robot knuckles caused by the weights is sensed by using a meter to measure the length at specific points and the state of wear of the bearing axis or the transmission shaft concerned is determined by a comparison with permissible backlash values.

It is disadvantageous in this case that the aforementioned procedure is comparatively time-consuming and an individual measurement is comparatively inaccurate. Increasing the accuracy of the measurement by frequent repetitions is, however, correspondingly time-consuming.

SUMMARY OF THE INVENTION

It is accordingly an object of the invention to provide a method and a measuring configuration for measuring backlash at an axial joint which overcome the above-mentioned disadvantages of the prior art methods and devices of this general type, with which the measurement is performed as quickly and accurately as possible.

The method for measuring the backlash at an axial joint of an industrial robot, in which a first and a second robot knuckle are movably connected to each other in a direction of rotation by an axial joint, is characterized in that a load-transmitting device applies a predeterminable force alternately in a measuring line to the first robot knuckle, connected to the free end of a robot arm. A displacement sensor measures the deflection of the first robot knuckle at a predetermined distance from the axis of rotation of the axial joint. An evaluation device is connected to the displacement sensor and calculates a turning angle of the first robot knuckle as a measure of a backlash present at the axial joint, taking into account the geometrical configuration data in the measurement of the displacement sensor and the industrial robot and also the measured deflection.

It is advantageous here that a deflection sensor now automatically measures the deflection of the first robot knuckle, and in this way eliminates the previously customary reading of measured values by operating personnel and the associated source of errors, such as for example a parallax error. In this way, the accuracy of the measurement is increased. Furthermore, it is also advantageous that the load-transmitting device prescribes a number of or many load cycles to increase the accuracy further, and consequently repeated measurement of the deflection is possible. This measure also further increases the accuracy of the measurement. The speed of measurement and its evaluation is also advantageously increased by the automated measurement and evaluation procedure.

In the case of the subject matter of the invention, a load-transmitting device is to be understood as meaning any device that applies force to a robot knuckle in the way described in more detail above. Depending on the degree of automation of the load-transmitting device, also provided here for example is a force measuring instrument, which continuously measures the force to be applied and so subjects the robot arm concerned to loads up to a maximum value, which is predeterminable. However, the force may also be preset in the load-transmitting device itself, so that no further measurements are necessary.

A further advantage of the method according to the invention is that merely one measured variable, that is a length, is recorded by the measurement. The only remaining requirement for the evaluation of the measurement or the interpretation of the measured values is the geometrical configuration data of the displacement sensor and the industrial robot or knuckles in the measurement. This takes into account in particular the distance of the displacement sensor from the axis of rotation, the alignment and accuracy of the displacement sensor in its measuring position, the bending of the knuckle under the influence of the force of the load-transmitting device and other angles and displacement data and their accuracy.

A preferred form of the method according to the invention provides that the alternating force is applied to the first robot knuckle parallel to the axis of rotation of the axial joint and the backlash is calculated as a bearing backlash.

In this case, it is advantageous that the force acts exclusively in the direction in which the bearing backlash for the axial joint is present at all. The deflection of the first robot knuckle picked up by the displacement sensor then corresponds essentially to the bearing backlash that is actually present.

In another case, the subject matter of the application is characterized in that the alternating force is applied to the first robot knuckle tangentially to the or in the directions of rotation of the axis of rotation of the axial joint and the transmission backlash of the axial joint is calculated as the backlash.

Here, the applied force has no axial element but only a tangential element with respect to the axis of rotation, with the result that the deflection picked up by the displacement sensor essentially corresponds to the transmission backlash.

Known sources of error, such as for example the bending of the robot knuckle under the effect of the force of the load-transmitting device, are correspondingly taken into account in the calculation of the transmission backlash. The displacement sensor is disposed at a predeterminable distance from the axis of rotation of the axial joint.

The object is also achieved by a measuring configuration for measuring the backlash at an axial joint of an industrial robot of the type stated at the beginning which is characterized in that a predeterminable force can be applied by a load-transmitting device alternately in a measuring line to a first robot knuckle, in that the deflection of the first robot knuckle brought about by the application of the force predetermines a direction of a measuring line, in that a displacement sensor is positioned in such a way that it measures in the direction of the measuring line, and in that the displacement sensor is disposed at a predeterminable distance from the axis of rotation of the axial joint.

The appropriate configuration of a load-transmitting device allows the first robot knuckle to be subjected in principle to loading as often as desired without restriction. In this way, a correspondingly high number of measurements is made possible and the measurement result as such is correspondingly accurate. Furthermore, the load-transmitting device makes it possible to carry out the application of force comparatively quickly, so that the backlash measurement and its evaluation are performed correspondingly quickly.

A development of the subject matter of the application according to the invention is characterized in that the measured deflection can be displayed by the displacement sensor.

In a simple case, the maximum deflections in both directions of the measuring line can consequently be displayed directly on the displacement sensor by a mechanical device (a pointer or the like) or an electronic device (a screen or the like).

In a further form, the measuring configuration is constructed in such a way that the displacement sensor is connected to an evaluation device. It is possible on a case-by-case basis to switch a measuring transducer between the displacement sensor and the evaluation device, in particular whenever the measurement data have to be filtered, selected or prepared in some other form, for example if the displacement sensor supplies an analog signal and the evaluation device requires digital data (packets).

In a further advantageous form of the measuring configuration according to the application the displacement sensor is connected by a holding device to a second robot knuckle, which is unmoved during the measurement.

Here there is the advantage that the second robot knuckle is connected to the robot foot, so that possible positional errors caused by the movement of the robot arm and the individual knuckles of the robot arm have no influence on the measured value of the displacement sensor for the first robot knuckle. In this configuration, the deflection sensor includes in particular possible deflection errors of the first robot knuckle in its measurement, while further possible deflections of the second robot knuckle or all the other knuckles which are disposed between the axial joint and the robot foot may indeed change the spatial position of the sensor, that is the absolute position of the sensor, but leave the relative position, that is the position with respect to the first robot knuckle, essentially uninfluenced.

Other features which are considered as characteristic for the invention are set forth in the appended claims.

Although the invention is illustrated and described herein as embodied in a method and a measuring configuration for measuring backlash at an axial joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
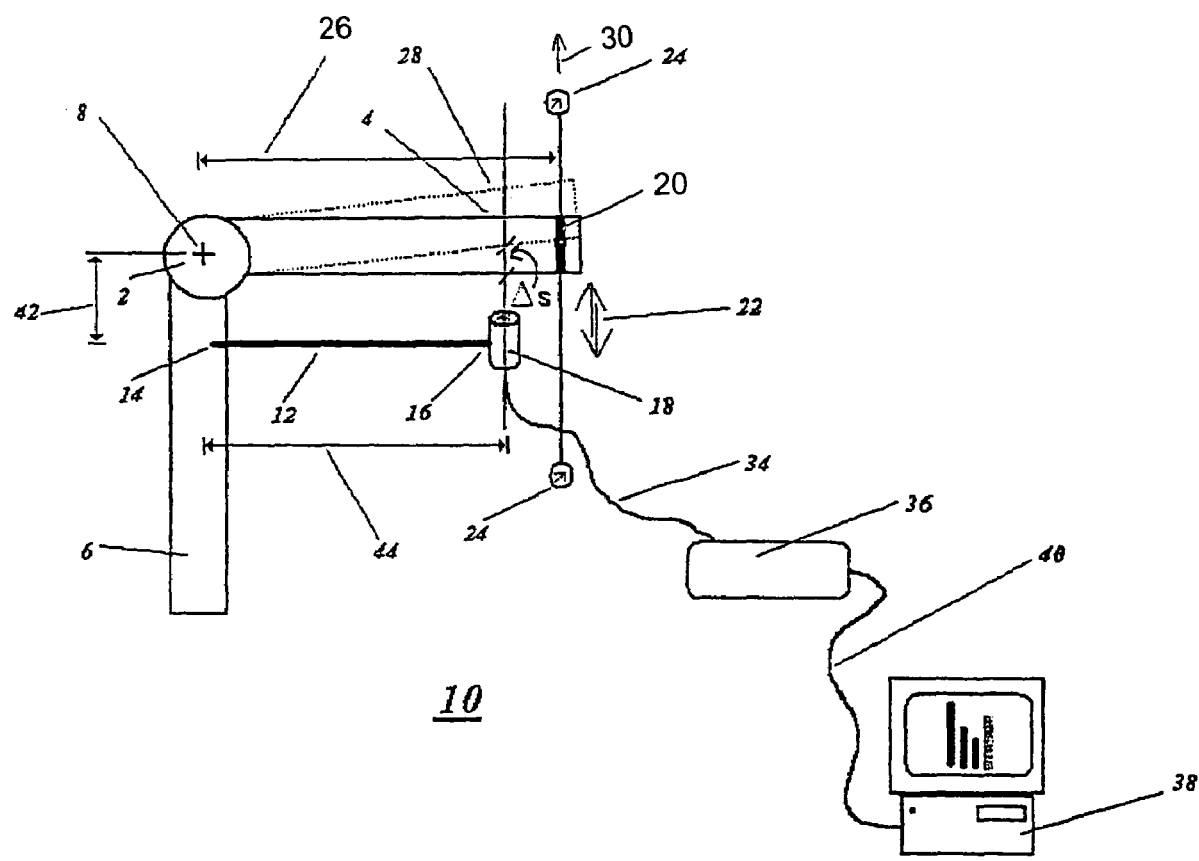
FIG. 1 is an illustration of a first measuring configuration according to the invention for measuring transmission backlash.

Referring now to the figures of the drawing in detail and first, particularly, to FIG. 1 thereof, there is shown, as an example a first measuring configuration 10 for a transmission backlash measurement on a multiaxial robot. Schematically shown for this purpose is an axial joint 2, which connects a first robot knuckle 4 and a second robot knuckle 6 rotatably movably about an axis of rotation 8. In the chosen example, the first robot knuckle 4 is intended here to be connected to the free end of a robot arm, while the second robot knuckle 6 is connected by further axial joints and further robot knuckles, which however are not represented here, to a robot foot, which in turn is connected to a foundation.

A holding bar 12 is fixedly connected by its first end 14 to the second robot knuckle 6. The connecting point is provided at a first distance from the axis of rotation 8. At a second end 16, a displacement sensor 18 is disposed and aligned in such a way that the displacement measurement proceeds precisely in the plane of FIG. 1 and, moreover, as represented in FIG. 1, exactly perpendicularly to the longitudinal extent of the first robot knuckle 4 in its starting position for the backlash measurement. In the chosen example, the first robot knuckle 4 and the second robot knuckle 6 form a right angle to each other. In this configuration, the holding bar 12 therefore runs exactly parallel to the unloaded starting position of the first robot knuckle 4.

Provided in the proximity of the free end of the first robot knuckle 4 is a connecting device 20. A non-illustrated load-transmitting device acts on the connecting device 20 and alternately applies a previously defined force as a load in the direction indicated in FIG. 1 by the first arrows 22. The load-transmitting device itself is not shown in FIG. 1, but the effects, that is the applied force on the first robot knuckle 4, are intended to be indicated symbolically by the joining lines between the connecting device 20 and two correspondingly disposed force measuring instruments 24. In the chosen example, the force is applied to the first robot knuckle 4 by tensile forces, for example cables acting on it. However, it is also quite conceivable for compressive forces or a mixture of compressive and tensile forces also to be introduced into a robot knuckle by corresponding pneumatic or hydraulic or electrohydraulic or just electric drives.

The chosen type of representation makes it particularly easy to see that the distance of the point of introduction of the force from the axis of rotation 8, referred to here as the first distance 26, must be chosen in dependence on the force applied, on account of the leverage produced, or the introduced torque on the axial joint 2. The force to be applied is preferably chosen such that on the one hand a transmission of the axial joint 2 is respectively brought into its end positions corresponding to the existing backlash, depending on the direction of the force, on the other hand a deformation of the first robot knuckle 4 falsifying the measurement is avoided. The first robot knuckle 4 is always bent slightly under the effect of the force. However, this can be taken into account in the handling and correction of the measured values of the displacement sensor 18.

In order to indicate this, a deflected position 28 has been represented as a dotted outline of the first robot knuckle 2 in a maximum deflected position, in the case where the predetermined maximum force is applied by the load-transmitting device exactly in the direction indicated by the second arrow 30.

The displacement sensor 18 is connected to a measuring transducer 36 by a measuring line 34. In the example represented, the measuring transducer 36 has a number of functions. The displacement sensor 18 supplies an analog signal, so that one of the tasks of the measuring transducer 36 is to convert the analog signal into a digital signal and make it available at its output, for example for an evaluation device. In this example, the output device is a measuring computer 38, which is connected to the output of the measuring transducer 36 by a second measuring line 40. The second measuring line 40 may, however, already be a data connecting line, for example in the case where the measuring transducer 36 is likewise a measuring computer and the output data have already been prepared for a prescribed or other defined data protocol. This has the special advantage that the measuring transducer 36 can then be used universally and so various bus systems or else various displacement sensors can be connected to the measuring transducer 36, without this device having to be structurally changed. On the other hand, a very flexible setup of the measuring configuration has made possible by such a measuring transducer 36. Apart from the measuring computer 38 represented, it is possible for example to feed the output signal of the measuring transducer 36 into an instrumentation and control system or into a measuring system, so that the data can also be transmitted to more remote points of the line, for example into a measuring station or over a data line or corresponding link via telecom lines and the Internet to, in principle, any location world wide.

On the basis of the above measuring configuration according to the invention for transmission backlash measurement at an axial joint of a robot, the method according to the invention is to be explained in more detail.

The load-transmitting device initially applies a force to the first robot knuckle 4 in one of the directions as indicated by the first arrow 22. On account of the effect of the force, the first robot knuckle 4 is then deflected from its load-free position and slightly displaced in the direction of the force. By use of the force measuring instrument 24 which is disposed on the side of the force acting, the force is continuously measured. The load-transmitting device restricts the maximum amount of the force in that the measured value of the force measuring instrument is transmitted to the load-transmitting device and the latter controls the currently prevailing loading of the first robot knuckle 4. The deflection process is sensed in terms of the distance covered by the displacement sensor 18. In the chosen example, the displacement sensor is an ultrasonic sensor, which senses even small differences in the distance covered with adequate accuracy. However, the displacement sensor may well also be an inductive proximity sensor or a laser sensor. The displacement sensor 18 is rigidly connected to the second robot knuckle 6 by the holding bar 12. The first end 14 is spaced away from the axis of rotation 8 by a first distance 42. Similarly, a second distance 44 is predetermined by the length of the holding bar 12, so that the position of the displacement sensor 18 is exactly determinable, for example in order to position the displacement sensor 18 at an optimum distance from the first robot knuckle 4.

The load-transmitting device maintains the predetermined load on the first robot knuckle 4 for a moment while the measurement of a deflection Δs is being continuously performed. After a certain time, the load is removed from the first robot knuckle 4 and the load-transmitting device then applies a force in exactly the opposite direction to that previously applied to the first robot knuckle 4. The deflection consequently then takes place in exactly the opposite direction. This process is also sensed by the displacement sensor 18. As already before, here too the force actually applied is sensed by a further force measuring device 24 and restricted to a predetermined maximum.

The data sensed by the displacement sensor 18 are passed on to the measuring transducer 36, which converts the analog signals received from the displacement sensor 18 into digital signals which can be used by the measuring computer 38.

The measuring computer 38 calculates on the basis of the geometrical arrangement data and the measured values of the displacement sensor 18, that is the measured deflection Δs in both measured directions in which the load was applied to the first robot knuckle 4, an actually existing backlash at the axial joint 2. On account of the loading direction chosen in this example, the calculated backlash is the transmission backlash, that is to say that backlash which can be measured in the direction of rotation of the axial joint 2. The account taken of the geometrical configuration data is explained in more detail with respect to FIG. 3. In the case of this arrangement, however, it is of advantage that the displacement sensor 18 is aligned exactly with a measuring line which corresponds to the expected directions of deflection of the robot knuckle and on account of the choice of the directions in which the force acts are aligned exactly parallel to the latter and tangential to the directions of rotation of the axis of rotation 8 of the axial joint 2. In order to eliminate unnecessary possible sources of error, the load-transmitting device also likewise acts in each case in both directions of the measuring line when it is applying its alternating load to the first robot knuckle 4. Possible errors in the alignment of the displacement sensor 18, for example an angular error in the alignment of the displacement sensor 18 with respect to the measuring line and the direction of the deflection of the first robot knuckle 4, can likewise be balanced out by the evaluation device by the correspondingly performed measurement of the geometrical configuration data of the displacement sensor 18.

Figure 2:
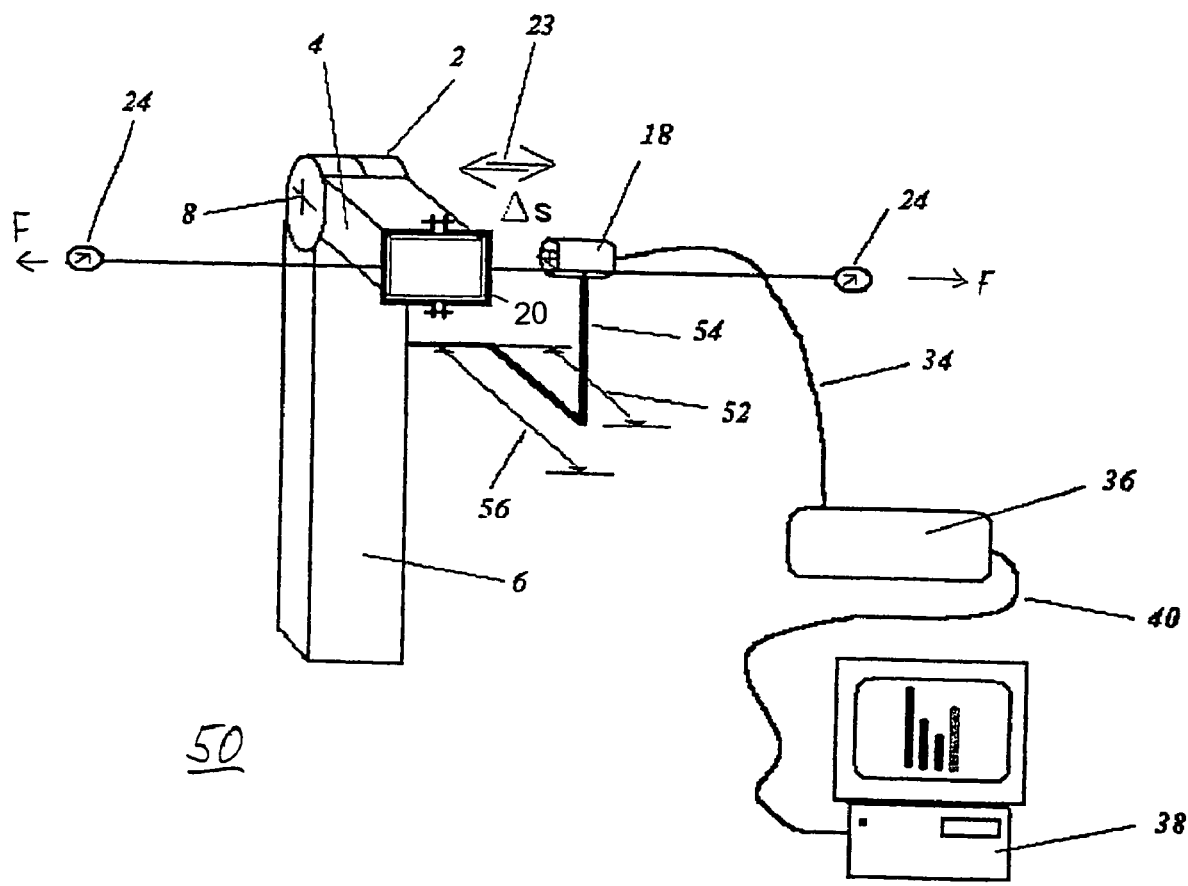
FIG. 2 is an illustration of a second measuring configuration according to the invention for measuring bearing backlash.

FIG. 2 shows a second measuring configuration 50, which is constructed in a way similar to the first measuring configuration 10, for which reason the same designations as in FIG. 1 are also used for identical components.

As a difference from FIG. 1, however, FIG. 2 shows a backlash measurement of the bearing backlash at the axial joint 2, that is to say that the measuring direction runs along the measuring line of the displacement sensor 18 exactly parallel to the axis of rotation 8 of the axial joint 2, to be precise exactly at a third distance 52, the distance corresponding to the clear distance between the displacement sensor 18 and the axis of rotation 8.

In FIG. 2, the displacement sensor 18 is kept in position by a second holding bar 54, the one end of which is in turn attached to the second robot knuckle 6 and the second end of which is connected to the sensor 18, the second holding bar 54 making it possible, as a difference compared to FIG. 1, for the displacement sensor 18 to be positioned as desired in all three spatial directions by means of two changes in spatial direction. In this case, the distance of the displacement sensor 18 from the first robot knuckle 4, that is in the direction of the axis of rotation 8, can be set by a first piece of the second holding bar 54, which is connected to the second robot knuckle 6. The clear distance between the displacement sensor 18 and the axis of rotation 8 is set by a second piece, which has the third distance 52 as its length. Finally, the still remaining third spatial direction can be set by a third piece of the second holding bar 54, which bears the displacement sensor 18 at its free end, so that the displacement sensor 18 is aligned with a specific distance from the first robot knuckle 4, the deflection of which this time however is of a parallel direction with respect to the axis of rotation 8 of the axial joint 2.

Accordingly, the load-transmitting device, again not represented in FIG. 2, acts on the first robot knuckle 4 along a parallel line with respect to the axis of rotation 8, the torque applied by the load-transmitting device being determined in each direction in which a load is applied not only by the applied maximum force F but also by the fourth distance 56, the magnitude of which is determined by the clear distance between the connecting device 20 and the axis of rotation 8.

The point of application of the load-transmitting device for introducing the alternately applied force as a force function; the connecting device is configured here as a clip, which encloses the first robot knuckle 4 with force closure and via which the load-transmitting device introduces forces into the first robot knuckle 4 for the movement of the latter back and forth, shown by the second arrows 23.

Figure 3:
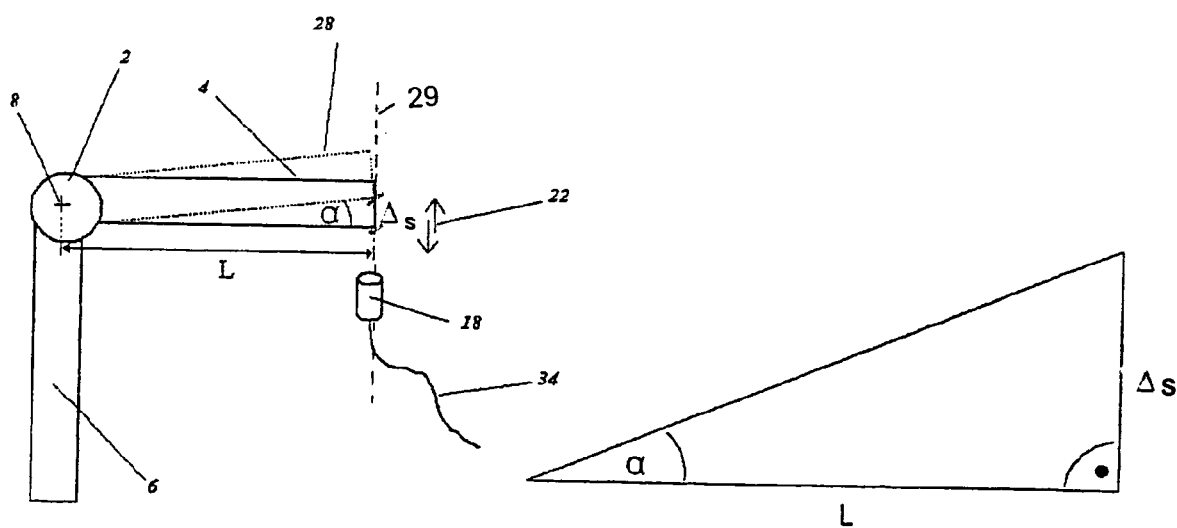
FIG. 3 is an illustration of a diagram showing the measuring principle of the measuring configuration.

FIG. 3 relates to FIG. 1 and represents the corresponding situation for a transmission backlash measurement at the axial joint 2 in the left half of the figure. Therefore, the same designations as in FIG. 1 have also been used for comparable components. Again, the first robot knuckle 4 is shown in its unloaded starting position, horizontal in FIG. 3, and in an upper deflected position 28.

In this case, the displacement sensor 18 is away from the axis of rotation 8 at a distance L. The first robot knuckle 4 is also brought into the deflected position 28 by an angle $\alpha$ by the powered unit of the load-transmitting device. A displacement distance $\Delta S$ thereby covered, as seen along the measuring line 29 of the displacement sensor 18, corresponds approximately to the distance actually covered by the first robot knuckle 4.

A small difference between the displacement distance actually covered by the robot knuckle 4 and the depicted displacement distance $\Delta S$ is constituted by the fact that the first robot knuckle 4 is forced by the rotation about the axis of rotation 8 onto a circular arc, which however is used, by approximation, in the form of a right-angled triangle for a calculation. This triangle as a basis for calculation is once again diagrammatically represented in the right half of the figure. In this case, the angle $\alpha$ is exaggerated. The angle $\alpha$ is usually a small angle in the range of degrees.

Accordingly, the calculation of the angle $\alpha$ can be represented by approximation as follows:

$$\alpha(\text{in degrees})=\arctan \Delta S/L.$$

This equation can be further improved by inserting correction factors.

It can be seen well from FIG. 3 that the displacement sensor 18 must merely measure the deflected distance $\Delta S$ to arrive at a specified angular value, which is dependent on geometrical arrangement data alone. If with respect to the application of a force or force function by the load-transmitting device it is also ensured that there is applied to the first robot knuckle 4 only such a force or force function that the transmission backlash is just detectable, without the bending of the robot knuckle 4 caused by exposure to the force reaching an appreciable value that could make the measurement unusable, the measuring configuration then provides a very accurate calculation basis for the calculation of the backlash.

In the further case of bearing backlash measurement, as represented in FIG. 2, there is no need for a comparable transformation of the deflected distance $\Delta S$ measured by the displacement sensor 18 to an angular figure. This is so because a possible bearing backlash at the axial joint 2 is expressed in a parallel displacement of the entire second robot knuckle 4 under the effect of the force of the load-transmitting device. The possible bending of the first robot knuckle 4 should, however, be taken into account.

Figure 4:
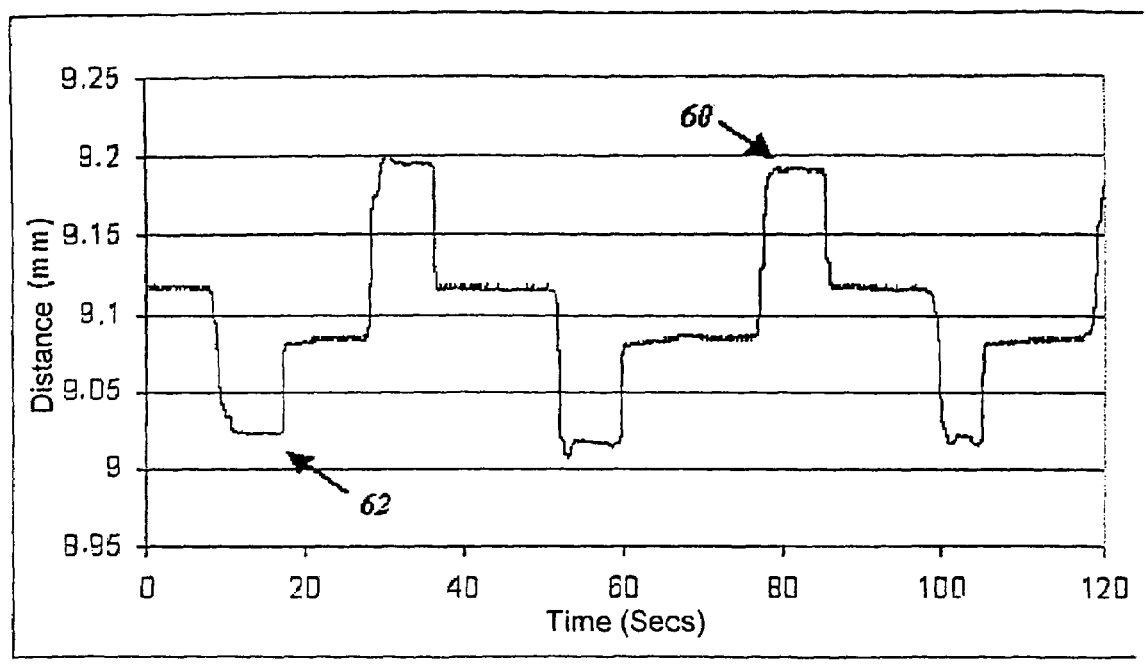
FIG. 4 is a graph showing an example of a measured value display for a backlash measurement.

FIG. 4 shows the illustration of an actual measurement of the displacement sensor 18, with which the deflection of the first robot knuckle 4 at the axial joint 2 was actually measured. Such a display could be represented for example on a display device on the measuring computer 38. In this case, the deflected distance $\Delta S$ is represented as a time-based curve profile in a diagram, the x-axis plotting the time in seconds, while the y-axis indicates a distance in mm.

The curve begins with a measured value for which the first robot knuckle 4 is unloaded, it being evident from the measured profile that the load-transmitting device thereafter expends a force which deflects the first robot knuckle 4 in the direction of the displacement sensor 18, so that the distance between the displacement sensor 18 and the robot knuckle 4 is reduced. After a specific dwell time at a predetermined maximum load, denoted here as low point 62 of the curve, there follows initially a load relief of the first robot knuckle 4, without force being exerted by the load-transmitting device, to be followed by loading by the load-transmitting device in the opposite direction than before. This process is repeated once again, the maximum deflection being measured at a high point 60.

It can be seen well from this representation that it is possible on the basis of the measurement both for the starting position of the first robot knuckle to be determined in a simple way and also for the determination of the high points 60 and the low points 62 to be easily established. Furthermore, here there is also the possibility of further improving the calculation results by generally known methods of averaging and error analysis.

Figure 5:
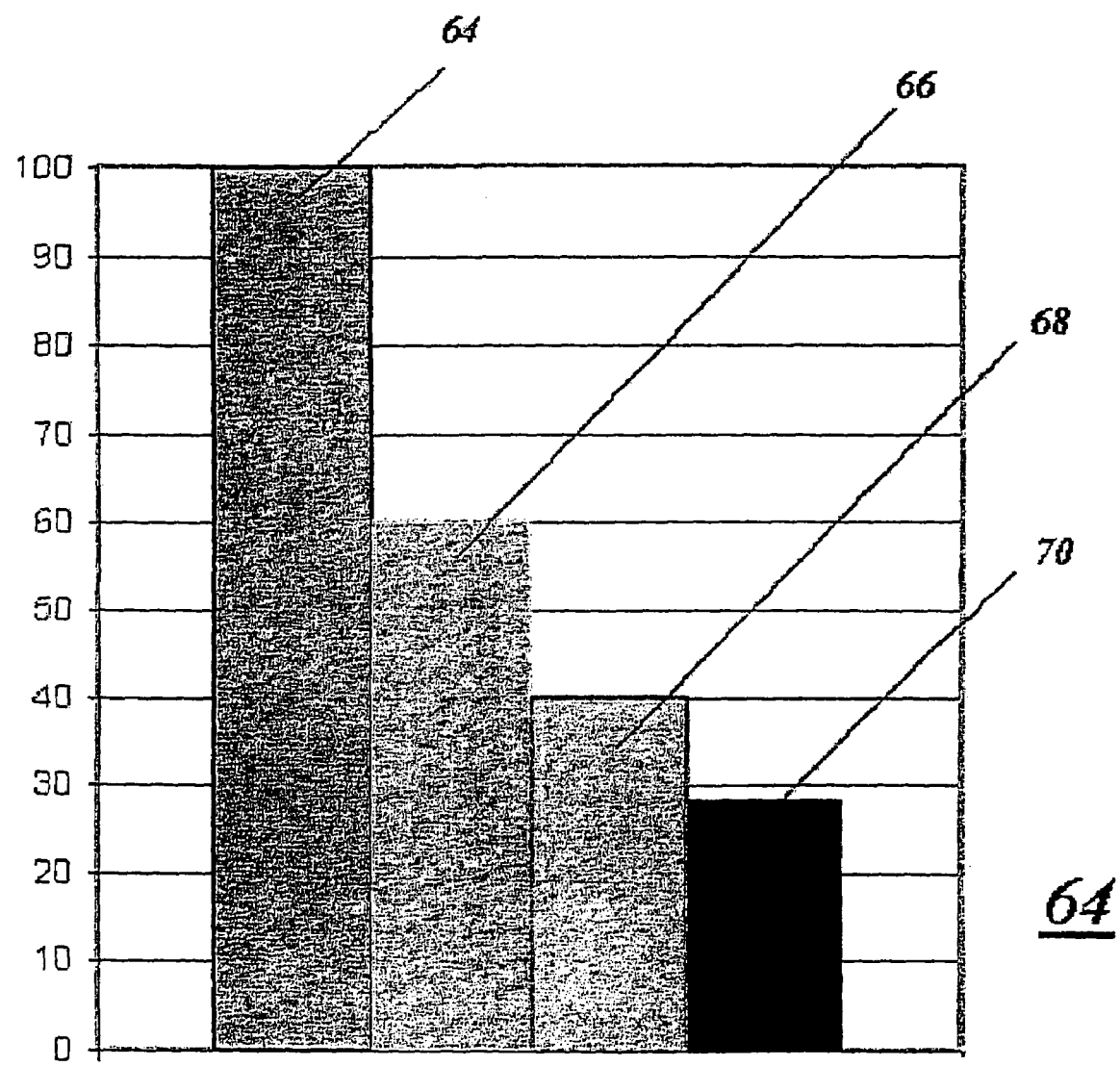
FIG. 5 is a graph showing an example of an assessed axial backlash measurement.

FIG. 5 shows the example of an assessed axial backlash measurement on the basis of an evaluation diagram 64. Assessed axial backlash measurement result in that direct measured values or filtered measured values, that is measured values selected or prepared in some form or other, are additionally weighted with a special factor.

So it is in this example too. Here, the measured backlash has been normalized on the coordinate axis to a percentage number between 0 and 100%, a 0% value corresponding to a backlash of 0 mm and 100% corresponding to a maximum backlash, which in principle can be arbitrarily predetermined. Therefore, a first column 64 corresponds to a maximum backlash at 100%. It is possible for example to fix this as a value at which it is found from experience that a limit where actually existing wear restricts or even disrupts the operation of the robot is reached. In FIG. 5, this is represented by a second column 66, which has a height of 60%. An actually measured axial backlash and its assessment is represented by a third column 68, which lies at approximately 40%. Also shown is a fourth column 70, which represents an already existing first backlash in the case of a new robot.

The assessment of an axial backlash measurement has special advantages. On the one hand, an actually measured absolute wear value has the disadvantage that the absolute value alone is not very informative, since the minimum and maximum values for the wear range must also be known to allow the statement as to whether the measured value is within allowed limits to be made. These maximum and minimum values are in turn individually dependent on the respective axis on the robot and also on the type of construction and the loading and so on. In this way, the operating personnel would have to know a large number of values in order to devise a comprehensive picture of the state of wear of the robot with a large number of different axes on the basis of the absolute measured values.

It is also possible in an assessed consideration of backlash measurement to allow empirical findings, available in particular to the service personnel of the robot manufacturer, to be included in the assessment factor, in order in this way to take further boundary conditions of the use of the robot into account, for example the type of task that the robot has to perform, or the programmed movement sequence that the robot undertakes in its work. The assessment factor is a specific sub-case of an assessment polynomial with which the empirical findings can be presented even better. In this way, the assessment factor or polynomial as a wear factor or wear function once again has an influence on the result, whether the absolute backlash measurement concerned already represents impermissible wear or can still be tolerated. A further advantage is that the wear limits, that is the minimum and maximum values within which measured wear is ideally located, can always be fixed to the same % limit in a percentage indication of the assessed backlash measurement, and so are conducive to user-friendly operation.

The following example may serve for a particularly advantageous form of the subject matter of the invention described above. For measuring the backlash at an axial joint, a measuring-transducer computer, a displacement sensor, a sensor holding device, a pulling device with a force measuring instrument and a data-processing system with measuring and visualizing software are required. The measuring transducer and the displacement sensor form a calibrated unit here. In this case, the displacement sensor is attached with the sensor holding device to one of the two robot knuckles of a transmission or bearing axis. In this case, the displacement sensor is disposed in the proximity of the other robot knuckle, so that only a comparatively small air gap to be measured remains between the robot knuckle and the displacement sensor. The robot is kept in position in the transmission backlash measurement by its motor and in the bearing backlash measurement by its bearing. The pulling device then exerts a defined force or force function in alternating directions along the measuring axis of the sensor on the corresponding robot knuckle, so that the air gap to be measured is alternately increased or decreased in size. The measured values are sensed by the sensor and sent by electronic methods by the measuring-transducer computer to the data-processing system. With the measuring and visualizing software of the data-processing system, possibly with the aid of filter functions, an air gap difference that is as free from errors as possible between the minimum and maximum distances between the robot knuckle and the displacement sensor, the measuring location and the type of mechanical backlash are calculated. In this case, the turning angle is initially determined from the selected displacement difference by the following formulas.

Turning angle α=arctan (displacement difference/distance of measuring location from axial center point)

The turning angle obtained in this way is brought into relation with empirically determined values of the robot manufacturer and correspondingly displayed as a percentage value of a wear value on a display. The formula for this is Display value (percent)=turning angle α×polynomial function where the polynomial function represents t the empirical value determined by the manufacturer. In the chosen example, the need for repair of the robot axis is applicable when there is a display value of 60% or more.

This application claims the priority, under 35 U.S.C. § 119, of German patent application No. 10 2004 028 558.6, filed Jun. 15, 2004; the entire disclosure of the prior application is herewith incorporated by reference.

We claim:

1. A method for measuring backlash of an axial joint of an industrial robot having a first and a second robot knuckle being movably connected to each other in a direction of rotation of the axial joint, which comprises the steps of:
providing a load-transmitting device for applying a predeterminable force or force function alternately directions along a measuring axis of the first robot knuckle, the load-transmitting device connected to a free end of a robot arm;
using a deflection sensor for measuring a deflection of the first robot knuckle at a predeterminable distance from an axis of rotation of the axial joint resulting in measurement data; and
using an evaluation device connected to the deflection sensor for calculating a rotational angle of the first robot knuckle as a measure of the backlash present at the axial joint, taking into account a measured deflection and a geometrical configuration of the disflection sensor and of the industrial robot.

2. The method according to claim 1, which further comprises:
applying the predetermined force or force function to the first robot knuckle parallel to the axis of rotation of the axial joint; and
calculating a bearing backlash as the backlash.

3. The method according to claim 1, which further comprises:
applying the predetermined force to the first robot knuckle tangentially to or in the directions of rotation of the axis of rotation of the axial joint; and
calculating a transmission backlash of the axial joint as the backlash.

4. The method according to claim 1, which further comprises multiplying the rotational angle by an empirically determined wear factor or an empirically determined wear function.

5. The method according to claim 1, which further comprises discretizing the measurement data of the deflection sensor using a measuring transducer.

6. The method according to claim 1, which further comprises performing at least one of filtering and selecting the measurement data of the deflection sensor.

7. The method according to claim 1, which further comprises comparing the measurement data with wear limit values.

8. The method according to claim 7, which further comprises displaying at least one of the measurement data, the wear limit values and a result of a comparison on a display device.

9. The method according to claim 1, which further comprises performing at least one of storing and transferring the measurement data into other data systems.

10. The method according to claim 1, which further comprises keeping the axial joint in position by the second robot knuckle together with a joint motor for a transmission backlash measurement or together with a transmission bearing for a bearing backlash measurement.

11. A measuring configuration for measuring backlash of an axial joint of an industrial robot having a first and a second robot knuckle movably connected to each other in a direction of rotation by the axial joint, the measuring configuration comprising:
- a load-transmitting device for applying a predetermined force in alternately directions along a measuring axis of the first robot knuckle, a deflection of the first robot knuckle being brought about by the predetermined force along a predetermined direction of the measuring axis, said load-transmitting device connected to a free end of a robot arm for inducing the predetermined force external to the industrial robot; and
- a displacement sensor positioned for measuring in the direction of the measuring axis and outputting measurement data, said displacement sensor disposed at a predetermined distance from an axis of rotation of the axial joint.

12. The measuring configuration according to claim 11, wherein a measured deflection can be displayed by said displacement sensor.

13. The measuring configuration according to claim 11, further comprising an evaluation device connected to said displacement sensor.

14. The measuring configuration according to claim 13, further comprising a measuring transducer being switched between said displacement sensor and said evaluation device.

15. The measuring configuration according to claim 14, further comprising computer program products by which a measurement and/or an evaluation of the measurement data is made possible are implemented in said evaluation device and/or in said measuring transducer.

16. The measuring configuration according to claim 13, wherein said evaluation device is a measuring computer.

17. The measuring configuration according to claim 16, wherein said measuring computer has a display screen.

18. The measuring configuration according to claim 11, further comprising a holding device connecting said displacement sensor to the second robot knuckle, which is unmoved during the measurement.

19. The measuring configuration according to claim 18, wherein said holding device is selected from the group consisting of a holding bar and a holding rod.

* * * * *